(12) United States Patent
Schmitt et al.

(10) Patent No.: US 11,999,305 B2
(45) Date of Patent: Jun. 4, 2024

(54) SOUND- AND HEAT-INSULATING ENCLOSURE FOR A PEDAL MOUNT OF A MOTOR VEHICLE

(71) Applicant: Dr. Ing. h.c. F. Porsche Aktiengesellschaft, Stuttgart (DE)

(72) Inventors: Stefan Schmitt, Leonberg (DE); Klaus Wagner, Asperg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 337 days.

(21) Appl. No.: 17/562,260

(22) Filed: Dec. 27, 2021

(65) Prior Publication Data

US 2022/0266770 A1    Aug. 25, 2022

(30) Foreign Application Priority Data

Feb. 24, 2021   (DE) ..................... 10 2021 104 357.3

(51) Int. Cl.
| | |
|---|---|
| *B60R 13/08* | (2006.01) |
| *B60K 23/00* | (2006.01) |
| *B60T 7/04* | (2006.01) |
| *G05G 1/36* | (2008.04) |
| *G05G 1/44* | (2008.04) |

(52) U.S. Cl.
CPC .......... *B60R 13/0815* (2013.01); *G05G 1/36* (2013.01); *G05G 1/44* (2013.01); *B60K 23/00* (2013.01); *B60R 2013/0807* (2013.01); *B60T 7/04* (2013.01)

(58) Field of Classification Search
CPC . B60R 13/08; B60R 13/0815; B60R 13/0807; B60R 13/083; B60R 13/0838; B60R 13/0846; B60R 13/0853; B60R 13/0884; B60R 2013/0807; B60T 7/04; B60T 7/06; B60K 23/00
USPC ....................................... 296/39.3; 74/484 R
See application file for complete search history.

(56) References Cited

U.S. PATENT DOCUMENTS

| | | | | |
|---|---|---|---|---|
| 6,330,838 B1 * | 12/2001 | Kalsi | ...................... | B60K 26/02 |
| | | | | 74/560 |
| 8,650,984 B2 * | 2/2014 | O'Neill | .................... | G05G 1/30 |
| | | | | 74/512 |
| 9,850,961 B2 | 12/2017 | Schoenfuss et al. | | |
| 10,401,896 B1 * | 9/2019 | Kim | ........................ | G05G 1/44 |

(Continued)

FOREIGN PATENT DOCUMENTS

| | | |
|---|---|---|
| CN | 205344524 U | 6/2016 |
| CN | 109334640 A | 2/2019 |

(Continued)

OTHER PUBLICATIONS

Text JP2019525116 (Year: 2019).*
Great Britain Search Report for Application No. GB2202564.7, dated Aug. 23, 2022, one page.

*Primary Examiner* — Dennis H Pedder
(74) *Attorney, Agent, or Firm* — Buchanan Ingersoll & Rooney PC (57) ABSTRACT

A sound- and heat-insulating enclosure of a pedal mount of a motor vehicle has at least one pedal mounted pivotably thereon. The enclosure has retaining contours, by which fixing on the pedal mount is possible. A pedal-independent high-quality sealing concept can be implemented by shifting a sealing plane between an interior of a cockpit and a footwell from the pedals toward the pedal mount.

10 Claims, 5 Drawing Sheets

(56) References Cited

U.S. PATENT DOCUMENTS

| | | | |
|---|---|---|---|
| 10,906,514 | B1 | 2/2021 | Kim et al. |
| 10,994,707 | B2 * | 5/2021 | Street .................... B60T 7/06 |
| 2018/0208162 | A1 | 7/2018 | Street et al. |

FOREIGN PATENT DOCUMENTS

| | | | |
|---|---|---|---|
| DE | 19508968 A1 | | 9/1996 |
| DE | 102008039622 A1 | | 3/2010 |
| DE | 102014217199 B3 | | 1/2016 |
| EP | 0629939 A1 | | 12/1994 |
| EP | 3224086 A1 | | 10/2017 |
| FR | 2980435 A1 | | 3/2013 |
| FR | 3010025 A1 | | 3/2015 |
| JP | 2019525116 A | * | 9/2019 |

* cited by examiner

SOUND- AND HEAT-INSULATING ENCLOSURE FOR A PEDAL MOUNT OF A MOTOR VEHICLE

CROSS-REFERENCE TO RELATED APPLICATION

This application claims priority to German Patent Application No. 10 2021 104 357.3, filed Feb. 24, 2021, the content of such application being incorporated by reference herein in its entirety.

FIELD OF THE INVENTION

The present invention relates to a sound- and heat-insulating enclosure for a pedal mount of a motor vehicle. The invention furthermore relates to a motor vehicle having such a sound- and heat-insulating enclosure.

BACKGROUND OF THE INVENTION

What is referred to as a "footwell cover" is usually arranged between an interior of a cockpit and a driver's cab and covers a transition between a dashboard and a front edge of a floor carpet in the footwell. In addition, it closes off the footwell at the top. In addition to a heat-insulating effect, such a footwell cover also performs the function of sound insulation since, in conjunction with a bulkhead insulation, it forms a double-shell wall and thus contributes significantly to the interior acoustics. In the driver's footwell, however, the sound- and heat-insulating enclosure of the footwell cover is at least severely impaired by pedals.

In order nevertheless to be able to achieve at least adequate sound and heat insulation, rubber lips or nonwovens are used, for example, fitting snugly against the respective pedal levers and thus sealing the latter to a greater or lesser extent. However, this only works if the pedal lever is sword-shaped and, moreover, narrow. Folding bellows are also known.

DE 195 08 968 A1, which is incorporated by reference herein, discloses a sound-absorbing assembly for sound-insulating a passenger compartment with respect to an engine bay in motor vehicles, which assembly comprises a bulkhead, which separates the engine bay and the passenger compartment from one another transversely to the longitudinal axis of the vehicle and has at least through-openings for a pedal mechanism, a dashboard, which projects from the bulkhead into the passenger compartment and has instruments, and an operating panel, as well as an adjoining cover, which extends underneath the dashboard as far as the bulkhead in the front foot region of the passenger compartment. In this case, the cover has apertures for the passage of the pedal mechanism. In order to be able to achieve improved sound insulation, the apertures are enclosed in a sealed manner together with the pedal mechanism parts and sleeves passed through them.

DE 10 2014 217 199 B3, which is incorporated by reference herein, discloses a clutch pedal system for a motor vehicle having a pedal carrier with a clutch pedal, which is mounted pivotably on said pedal carrier, and a master cylinder connected to the clutch pedal, on the one hand, and to the pedal carrier, on the other hand. The pedal carrier has a fastening region and an adapter region, via which the master cylinder is connected to the pedal carrier. The pedal carrier, in turn, is designed to be exchangeable in order to compensate for different inclinations of the dashboard and/or of an equipment carrier by means of different configurations in respect of the alignment of its adapter region relative to its fastening region, while retaining the master cylinder.

DE 10 2008 039 622 A1, which is incorporated by reference herein, discloses an arrangement in a motor vehicle having a vehicle bulkhead in which a passage opening is provided, and having a cover for the passage opening, in which an opening is likewise provided. A unit on the engine-bay side is connected to a unit on the passenger-compartment side via the opening and the passage opening. In this case, the cover is arranged in a sealing manner on the unit on the engine-bay or passenger-compartment side, on the one hand, and in a sealing manner on the vehicle bulkhead, on the other hand. Here, the cover per se is designed in the manner of a bellows and encloses the connecting part in a sealed manner and independently of movement.

EP 3 224 086 A1, which is incorporated by reference herein, discloses a pedal mount with movable pedals and rubber cheeks which fit snugly against said mount for sealing purposes.

SUMMARY OF THE INVENTION

A disadvantage of the prior-art seals on pedals with respect to a footwell in a motor vehicle is that they must either be specially adapted to the shape of the pedals or are comparatively complex to produce.

The present invention is therefore concerned with the problem of completely redesigning a seal on the pedals of a motor vehicle with respect to a footwell.

The present invention is based on the general concept of shifting a sealing plane for sealing off a footwell of a motor vehicle in the direction of an interior of a cockpit from the actual pedals, e.g. the clutch pedal or brake pedal, toward a pedal mount, thereby allowing clearly improved sealing both in respect of sound transmission and of heat transfer, and also unhindered freedom of movement of the pedals. According to aspects of the invention, therefore, a sound- and heat-insulating enclosure is provided for such a pedal mount of a motor vehicle, wherein at least one pedal mounted pivotably on the pedal mount itself is provided thereon. The enclosure has retaining contours, by means of which fixing on the pedal mount is possible. Such an enclosure thus encloses the pedal mount on a rear side facing away from the pedals and consequently forms a type of housing for the pedal mount, which housing can be connected in a sealed manner to a footwell cover by means of corresponding flanges. This offers the great advantage that the enclosure is independent of the shape of the pedal levers, for example sword-shaped or wide, and, in addition, can be fixed to the pedal mount without further fastening means, such as screws or the like. By means of its flanges, the enclosure can furthermore form a holder for the footwell cover. A further great advantage of the enclosure according to aspects of the invention is that it can be fixed to the pedal mount by means of its holding contours without modifying the pedal mount, e.g. by means of an undercut joint, a latching joint or a clip joint, or the like. Purely in theory, a clamped joint is also conceivable. By means of its flanges or walls, the enclosure itself can be connected in a sealed manner both to the footwell cover and to a bulkhead of a motor vehicle and thus offers a clearly improved sound- and heat-insulating effect.

In an advantageous development of the solution according to aspects of the invention, the enclosure has two enclosure parts, which can be connected to one another by means of a clip joint. This embodiment permits particularly simple assembly of the enclosure on the pedal mount, wherein, for example, the two enclosure parts are first fixed on the pedal mount and then to one another via the clip connection. By releasing the clip connection between the two enclosure parts, clearly simplified removal of the enclosure is furthermore possible. Alternatively, it is, of course, also conceivable for the enclosure to be of one-part or integral design, thereby making it possible to save storage and logistics costs. Such a one-part enclosure likewise permits comparatively simple mounting on the pedal mount, for example by slipping the enclosure over the pedal mount and latching it to the latter.

It is expedient if the enclosure is made of plastic, in particular as a plastic injection molding or as a foamed plastic part. In particular, design as a plastic injection molding makes possible a design which is not only inexpensive but also of high quality, it being possible to influence the sound- and heat-insulating effect of the enclosure in an individual and comparatively simple manner by selecting an appropriate plastic or by selecting the thickness of the plastic. If the enclosure is designed as a foamed plastic part, for example, a comparatively high heat-insulating effect can be achieved with it, while at the same time ensuring a low weight.

In an alternative embodiment of the enclosure according to aspects of the invention, it has an injection-molded supporting structure, which is overmolded with a foamed plastic. The plastic supporting structure thus forms a support for the sound- and heat-insulating enclosure and ensures fastening on the pedal mount, while the foamed plastic surrounding the injection-molded supporting structure ensures the heat-insulating effect. Such a hybrid component permits weight-optimized production and at the same time extremely reliable fixing of the enclosure on the pedal mount.

It is expedient if the enclosure has projecting flanges. By means of these projecting flanges, it is possible to make contact, for example, with a footwell cover or with a bulkhead of a motor vehicle, thereby making it possible to create a sound- and heat-insulating transition to the footwell cover or to the bulkhead. In this case, the flanges are formed integrally with the enclosure and are produced simultaneously with the enclosure.

The present invention is furthermore based on the general concept of equipping a motor vehicle with a cockpit, a footwell and a pedal mount with at least one pivotably mounted pedal projecting into the footwell, and an enclosure corresponding to the previous paragraphs, wherein the enclosure is fixed on the pedal mount and forms a sound and cold barrier or heat barrier between an interior of the cockpit and the footwell of the motor vehicle. In such a motor vehicle, it is possible to achieve a particularly high level of sound- and heat-insulating sealing in the region of the pedals in the footwell of the passenger compartment, wherein the sealing plane has now been shifted into the region of the pedal mount. This offers the great advantage that a very wide variety of pedals and pedal levers can be arranged on the actual pedal mount, e.g. depending on the equipment version of the motor vehicle, without the enclosure having to be adapted to the different pedals, since, according to aspects of the invention, this enclosure now surrounds the pedal mount with a sound- and heat-insulating effect. The enclosure is usually mounted before the cockpit is inserted, e.g. directly after the pedal mount is inserted.

It is expedient if a footwell cover is provided which forms a cold barrier between the interior of the cockpit and the footwell, wherein the footwell cover is connected to the enclosure. Here, a sound- and heat-insulating connection between the footwell cover and the enclosure can be accomplished by means of the flanges which are provided on the enclosure and on which the footwell cover rests in a sealed manner in the installed state. In this case, the enclosure can even serve as a holder or carrier for the footwell cover.

Expediently, the pedal mount has ribs and grooves, in which the enclosure engages positively and is thereby fixed on the pedal mount. Such ribs or grooves can also form undercut contours, behind which corresponding holding contours on the enclosure engage and which thereby enable comparatively simple clip or latching connection of the enclosure to the pedal mount. However, such a clip or latching joint not only permits comparatively simple mounting, but, in the reverse case, in particular for maintenance purposes, also comparatively simple disassembly, thereby making it possible to reduce maintenance and repair costs.

It is expedient if the pedal mount has projecting flanges and rests via at least one of these flanges in a sealed manner against a bulkhead of the motor vehicle. Comparatively simple sound- and heat-insulating sealing with respect to the bulkhead is thereby possible.

Further important features and advantages of the invention will be found in the dependent claims, the drawings and the associated description of the figures with reference to the drawings.

It is self-evident that the features mentioned above and those that will be explained below can be used not only in the respectively specified combination but also in other combinations or on their own without departing from the scope of the present invention.

BRIEF DESCRIPTION OF THE INVENTION

Preferred exemplary embodiments of the invention are illustrated in the drawings and are explained in greater detail in the following description, wherein identical reference signs refer to identical or similar or functionally identical components.

The following figures are each schematic, wherein.

DETAILED DESCRIPTION OF THE INVENTION

According to FIGS. 1 to 5, a sound- and heat-insulating enclosure 1 for enclosing a pedal mount 2 (see FIGS. 2 to 5) of a motor vehicle 7 is shown, wherein the pedal mount 2 has at least one pedal 3 mounted pivotably thereon. According to FIGS. 2 to 5, the pedal mount 2 even has a total of two pedals 3 pivotably mounted thereon. In addition, the enclosure 1 according to aspects of the invention has retaining contours 4, by means of which fixing on the pedal mount 2, in particular even without further fixing means, such as screws, is possible. In this case, the enclosure 1 according to aspects of the invention can be fixed on the pedal mount 2 by means of a latching or clip joint, for example, but also by means of a clamped joint.

In general, it is possible with the enclosure 1 according to aspects of the invention to shift a sealing plane between an interior 5 of a cockpit and a footwell 6 of the motor vehicle 7 away from the actual pedals 3 toward the pedal mount 2. This makes it possible to design the seal independently of the configuration of the pedals 3 or their pedal levers, e.g. in the manner of a sword or else wider.

In this case, the enclosure 1 can either be of one-part or of multi-part design, e.g. can have two enclosure parts 8, 9, which can be connected to one another by means of a clip joint. Comparatively simple mounting and dismounting of the enclosure 1 on the pedal mount 2 is thereby possible, as a result of which both the mounting costs and the dismounting costs, particularly during maintenance and repair work, are significantly reduced.

It is possible for the enclosure 1 itself to be made of plastic, in particular as a plastic injection molding or as a foamed plastic molding, and as a result to be produced not only in high quality but also at low cost. Alternatively, it is also conceivable for the enclosure 1 to have an injection-molded supporting structure, which is overmolded with a foamed plastic. In this case, the injection-molded supporting structure serves primarily for fixing the enclosure 1 on the pedal mount 2, while the foamed plastic molded around the injection-molded supporting structure serves for insulation.

Continuing to consider FIGS. 1 to 5, it can be seen that the enclosure 1 or its enclosure parts 8, 9 have projecting flanges 10, by means of which, for example, sound- and heat-insulating connection to a footwell cover 11 (see FIGS. 3 to 5) is possible.

The present invention simultaneously comprises the motor vehicle 7 described in the previous paragraphs, having the cockpit, the footwell 6 and the pedal mount 2 with at least one pedal 3 mounted pivotably thereon and projecting into the footwell 6, and having an enclosure 1 corresponding to the previous paragraphs. In this case, this enclosure 1 is fixed on the pedal mount 2, in particular by means of a clip joint, and forms a sound and cold barrier between the interior 5 of the cockpit and the footwell 6.

The footwell cover 11 rests in a sealed manner on the flanges 10 of the enclosure 1 (cf. especially FIG. 5) and can be adhesively bonded there to the flanges 10, for example. It is clearly apparent, especially from FIG. 5, that the enclosure 11 encloses only the pedal mount 2 and is secured thereon, but in no way touches the pedals 3 or their pedal levers and, as a result, also in no way limits their mobility. In addition, ribs 12 and grooves 13 can be provided on the pedal mount 2, wherein the enclosure 1 engages via its retaining contours 4 in the grooves 13, for example, and thereby forms an undercut joint therewith. In this way, extremely simple and at the same time reliable fixing of the enclosure 1 on the pedal mount 2 is possible.

Figure 1:
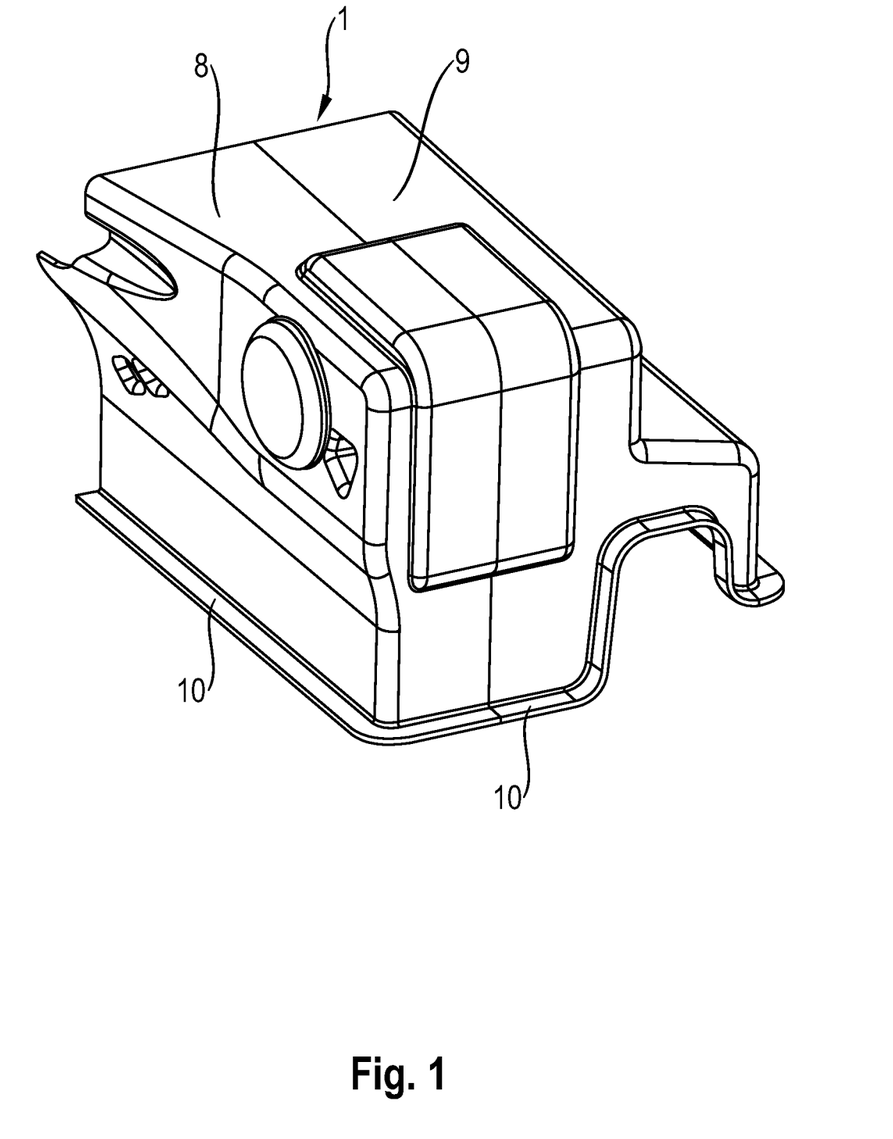
FIG. 1 shows a view of a sound- and heat-insulating enclosure according to aspects of the invention for a pedal mount.
Figure 2:
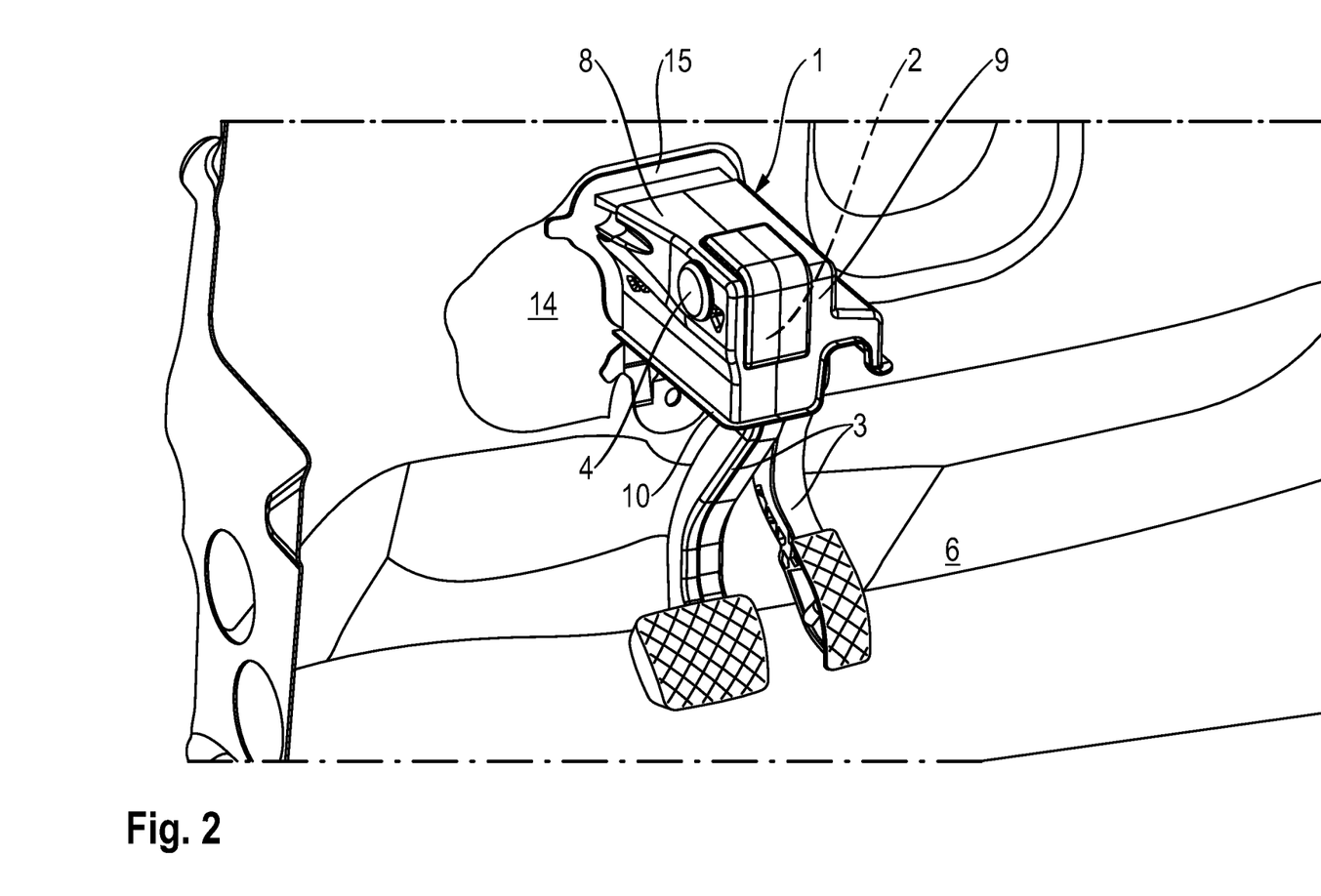
FIG. 2 shows an illustration like that in FIG. 1, but with a pedal mount.
Figure 3:
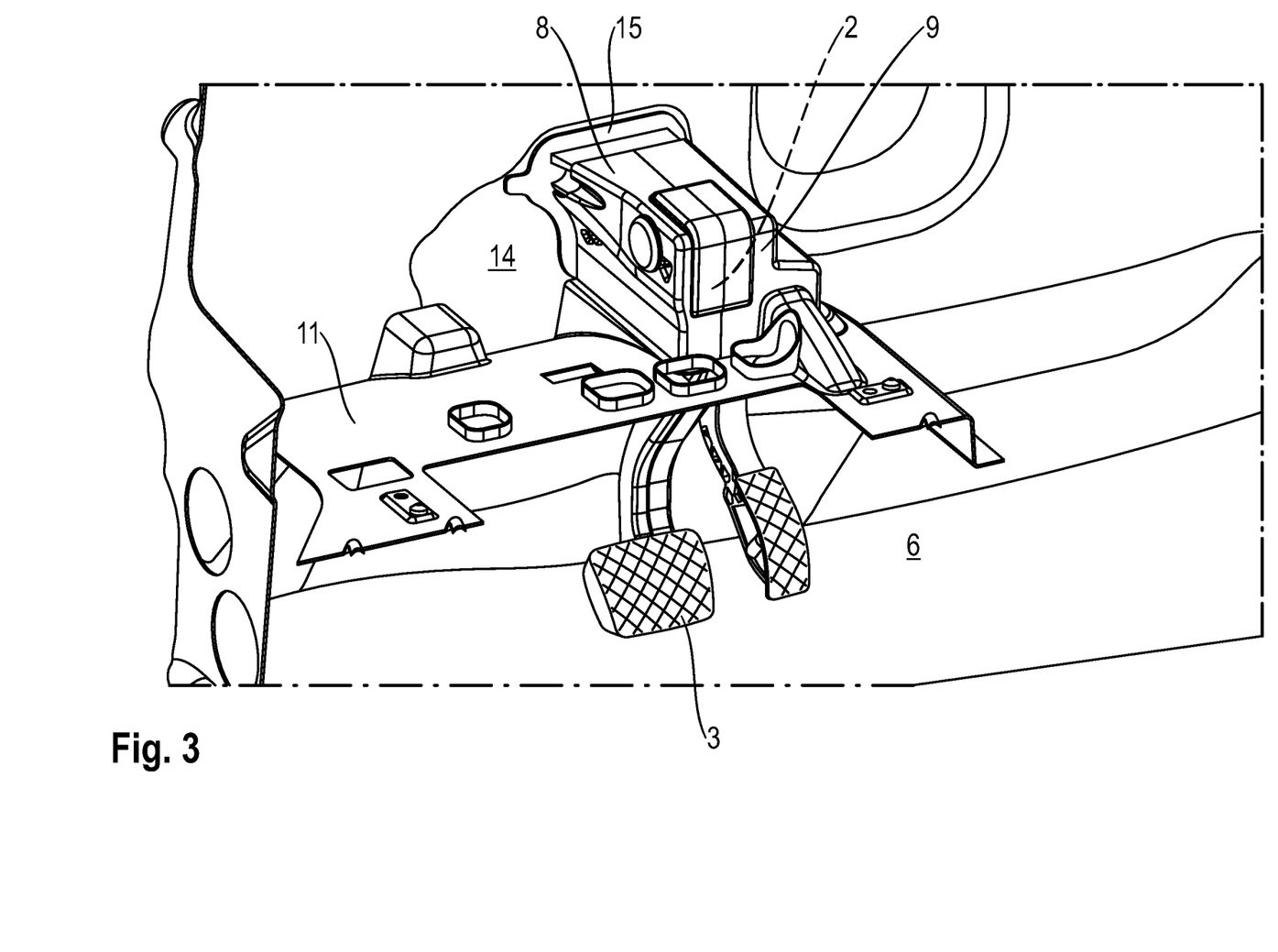
FIG. 3 shows an illustration like that in FIG. 2, but additionally with a footwell cover.
Figure 4:
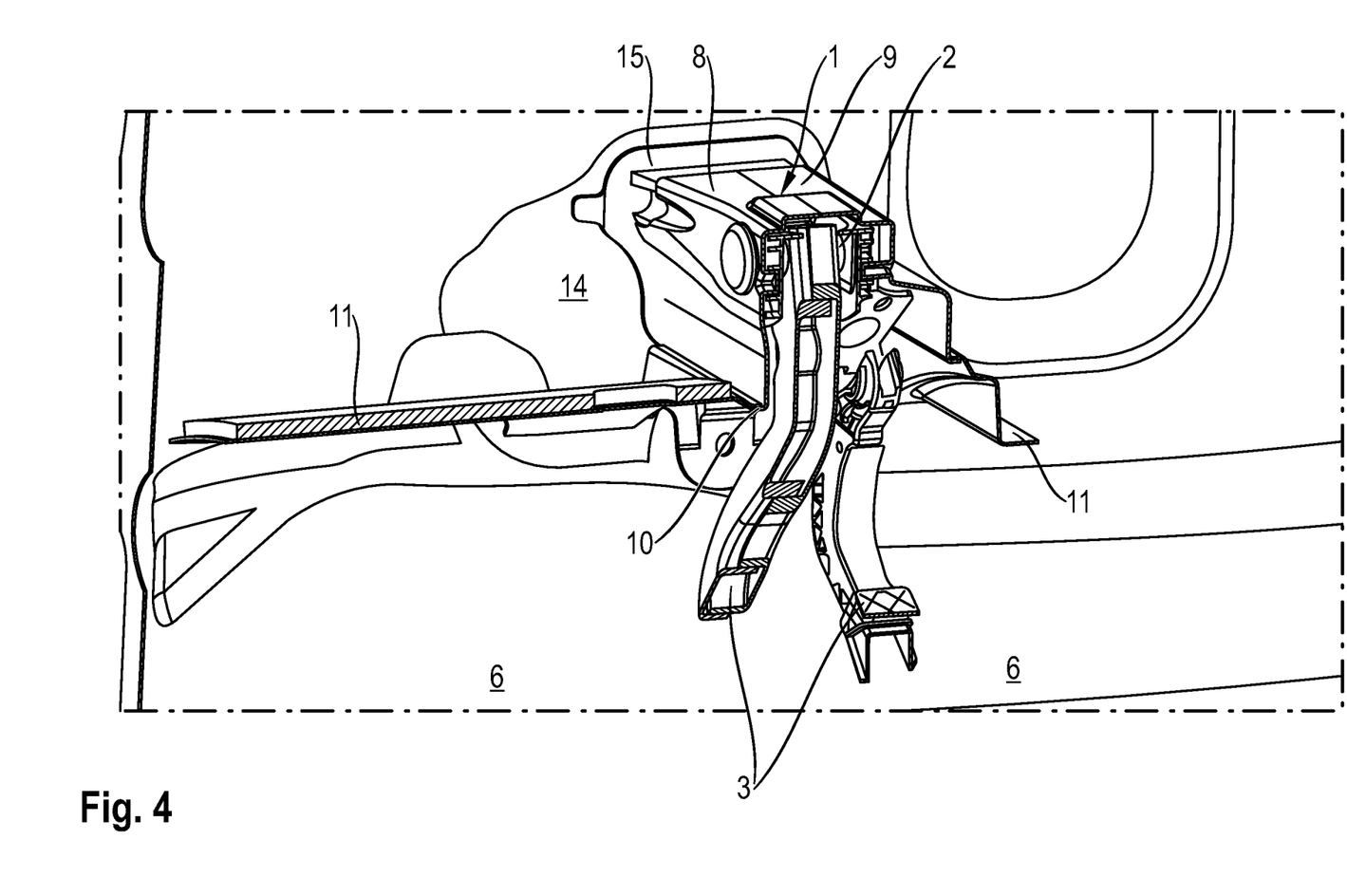
FIG. 4 shows an enlarged illustration of FIG. 3 in a section through the sound- and heat-insulating enclosure according to aspects of the invention.
Figure 5:
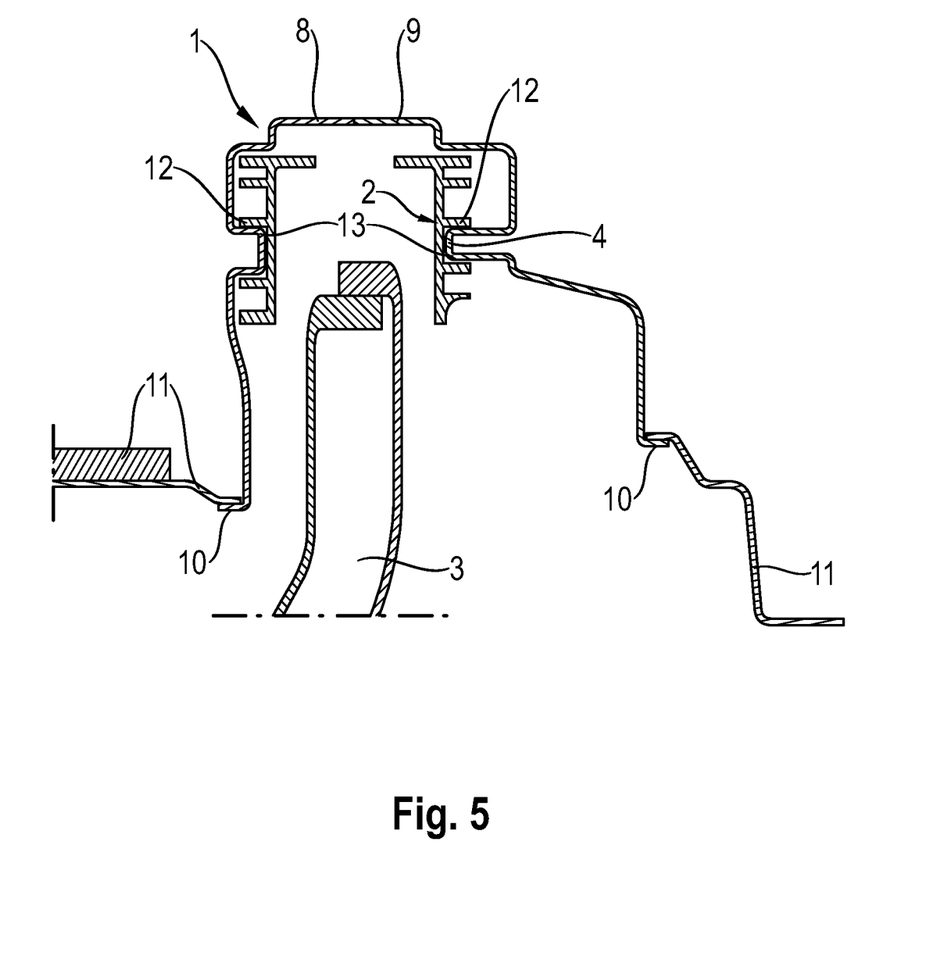
FIG. 5 shows a section through the enclosure.

According to FIGS. 2 to 4, it can furthermore be seen that the enclosure 1 rests in a sealed manner against a flange 15 of the pedal mount 2, wherein the flange 15 in turn rests in a sealed manner against the bulkhead 14 and thereby allows sealing between the interior 5 of the cockpit and the footwell 6.

The great advantage of the enclosure 1 according to aspects of the invention is that it can be used independently of the form and shape of the pedals 3 since the sealing plane previously located in the region of the pedals 3 has now been shifted into the region of the pedal mount 2. At the same time, the enclosure 1 can be designed in such a way that it can be fixed on the pedal mount 2 without further fastening means, for example by means of simple latching and clip joints, with the result that no modifications at all are required even on the pedal mounts 2 used hitherto. The positive connection between the enclosure 1 and the pedal mount 2 also allows comparatively simple assembly and disassembly. Moreover, by designing the enclosure 1 as, for example, a plastic injection molding, it can be produced inexpensively and with a high quality.

A pedal-independent high-quality sealing concept can be implemented by shifting a sealing plane between an interior (5) of a cockpit and a footwell (6) from the pedals (3) toward the pedal mount (2).

What is claimed is:

1. A motor vehicle comprising:
   a cockpit,
   a footwell,
   a pedal mount,
   at least one pedal mounted pivotably to the pedal mount and projecting into the footwell, and
   an enclosure having retaining contours to which the pedal mount is fixed, wherein the enclosure is fixed on the pedal mount and forms a sound and cold barrier between an interior of the cockpit and the footwell,
   wherein the enclosure rests in a sealed manner against a flange of the pedal mount, wherein the flange in turn rests in a sealed manner against a bulkhead and thereby allows sealing between the interior of the cockpit and the footwell.

2. The motor vehicle as claimed in claim 1, wherein the enclosure is of one-part design.

3. The motor vehicle as claimed in claim 1, wherein the enclosure is either a plastic injection molding or a foamed plastic part.

4. The motor vehicle as claimed in claim 1, wherein the enclosure has an injection-molded supporting structure.

5. The motor vehicle as claimed in claim 1, wherein the enclosure further comprises projecting flanges.

6. The motor vehicle as claimed in claim 1, wherein the enclosure is composed of plastic.

7. The motor vehicle as claimed in claim 1, further comprising a footwell cover which forms a cold barrier between the interior of the cockpit and the footwell, wherein the footwell cover is connected to the enclosure.

8. The motor vehicle as claimed in claim 7, wherein the pedal mount has grooves in which the enclosure engages positively with the retaining contours and is thereby fixed on the pedal mount.

9. A motor vehicle comprising:
   a cockpit,
   a footwell,
   a pedal mount,
   at least one pedal mounted pivotably to the pedal mount and projecting into the footwell,
   an enclosure having retaining contours to which the pedal mount is fixed, wherein the enclosure is fixed on the pedal mount and forms a sound and cold barrier between an interior of the cockpit and the footwell, and
   a footwell cover which forms a cold barrier between the interior of the cockpit and the footwell, wherein the footwell cover is connected to the enclosure,
   wherein the enclosure further comprises projecting flanges, and the footwell cover rests in a sealed manner on at least one flange in the installed state.

10. A motor vehicle comprising:
    a cockpit,
    a footwell, a pedal mount,
at least one pedal mounted pivotably to the pedal mount and projecting into the footwell, and
an enclosure having retaining contours to which the pedal mount is fixed, wherein the enclosure is fixed on the pedal mount and forms a sound and cold barrier between an interior of the cockpit and the footwell, and wherein the enclosure is of multi-part design and has two enclosure parts each having one of the retaining contours, which enclosure parts are connected to one another.

* * * * *